(12) United States Patent
Mizumoto et al.

(10) Patent No.: US 12,502,846 B2
(45) Date of Patent: Dec. 23, 2025

(54) MOLDED BODY AND METHOD FOR MANUFACTURING SAME

(71) Applicant: MITSUI CHEMICALS, INC., Tokyo (JP)

(72) Inventors: Kazuya Mizumoto, Sodegaura (JP); Takeharu Isaki, Chiba (JP); Atsushi Miyata, Urayasu (JP); Yoshihiko Kanda, Ichihara (JP); Kazutoshi Fujihara, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 49 days.

(21) Appl. No.: 18/245,292

(22) PCT Filed: Sep. 9, 2021

(86) PCT No.: PCT/JP2021/033204
§ 371 (c)(1),
(2) Date: Mar. 14, 2023

(87) PCT Pub. No.: WO2022/059598
PCT Pub. Date: Mar. 24, 2022

(65) Prior Publication Data
US 2023/0356480 A1  Nov. 9, 2023

(30) Foreign Application Priority Data

Sep. 17, 2020 (JP) ................................. 2020-156417

(51) Int. Cl.
| | | |
|---|---|---|
| B29C 70/16 | (2006.01) | |
| B29C 35/02 | (2006.01) | |
| B29C 35/16 | (2006.01) | |
| B29C 70/00 | (2006.01) | |
| B29C 70/54 | (2006.01) | |
| B29K 23/00 | (2006.01) | |
| B29K 307/04 | (2006.01) | |
| B29K 309/08 | (2006.01) | |
| B32B 5/26 | (2006.01) | |

(52) U.S. Cl.
CPC ................ *B29C 70/16* (2013.01); *B32B 5/26* (2013.01); *B29C 35/02* (2013.01); *B29C 2035/1616* (2013.01); *B29C 70/003* (2021.05); *B29C 70/545* (2013.01); *B29C 2791/004* (2013.01); *B29C 2793/0081* (2013.01); *B29K 2023/12* (2013.01); *B29K 2307/04* (2013.01); *B29K 2309/08* (2013.01); *B29K 2995/0077* (2013.01); *B32B 2262/101* (2013.01); *B32B 2262/106* (2013.01)

(58) Field of Classification Search
CPC ....... B29C 70/16; B29C 35/02; B29C 70/202; B29C 70/30; B32B 5/26; B32B 2262/101; B32B 2262/106; B32B 5/12; B32B 5/02
See application file for complete search history.

(56) References Cited

U.S. PATENT DOCUMENTS

| | | |
|---|---|---|
| 2012/0279017 A1 | 11/2012 | Reussmann et al. |
| 2015/0239207 A1 | 8/2015 | Selyugin et al. |
| 2017/0106606 A1* | 4/2017 | Toyozumi .................. C08J 5/04 |
| 2020/0346430 A1 | 11/2020 | Fujii et al. |

FOREIGN PATENT DOCUMENTS

| | | | |
|---|---|---|---|
| CA | 2882159 A1 * | 8/2015 | ........... B29C 70/202 |
| CN | 102844483 A | 12/2012 | |
| CN | 104859839 A | 8/2015 | |
| CN | 111278641 A | 6/2020 | |
| JP | H07214714 A | 8/1995 | |
| JP | 2009286817 A | 12/2009 | |
| JP | 2019048400 A | 3/2019 | |
| JP | 2021160263 A | 10/2021 | |
| WO | 2014106924 A1 | 7/2014 | |
| WO | WO-2020182908 A1 * | 9/2020 | ........... B29C 70/202 |

OTHER PUBLICATIONS

Machine translation (Year: 2025) of CN102844483.*

* cited by examiner

*Primary Examiner* — Blaine Copenheaver
(74) *Attorney, Agent, or Firm* — BUCHANAN INGERSOLL & ROONEY PC

(57) ABSTRACT

The present invention addressed the problem of providing a molded body which has a high performance of reducing energy caused by the application of a load, and which is obtained from a fiber-reinforced resin containing reinforcing fibers arranged while aligned in one direction. To solve the problem, the present invention relates to a molded body, including a reinforced layer formed by layering fiber-reinforced resin layers containing a plurality of reinforcing fibers arranged while aligned in one direction and a matrix resin impregnated with the reinforcing fibers. In the molded body, the reinforced layer has a plurality of alignment shifted layers, which are fiber-reinforced resin layers in which the shift angle, i.e., the angle formed by the reinforcing fibers with respect to the longitudinal direction of the reinforced layer, is 25° to 65° or −65° to −25°.

16 Claims, No Drawings

MOLDED BODY AND METHOD FOR MANUFACTURING SAME

TECHNICAL FIELD

The present invention relates to a molded body and a manufacturing method of the same.

BACKGROUND ART

A fiber reinforced resin including a plurality of reinforcing fibers oriented and arranged in a predetermined direction, and a resin composition (matrix resin) impregnated in the reinforcing fiber is known. Since this fiber reinforced resin is lighter than metal and has high mechanical strength, its use as various structural or reinforcing materials has been considered.

PTL 1 discloses use, as a shock-absorbing member for automobiles, of a layered structural material, in which a fiber reinforced resin including reinforcing fibers oriented in two directions orthogonal to each other and arranged in a lattice and a matrix resin impregnated in the reinforcing fibers, is sandwiched with a fiber reinforced resin including reinforcing fibers oriented at random and matrix resin impregnated in the reinforcing fibers.

PTL 1 describes that the reinforcing fibers arranged in a lattice are disposed at orientations of 0 degree (front-rear direction) and 90 degrees (width direction) with respect to the vehicle front-rear direction. PTL 1 describes that the reinforcing fibers arranged in a lattice have large strength against the striking load in the front-rear direction.

CITATION LIST

Patent Literature

PTL 1
WO2014/106924

SUMMARY OF INVENTION

Technical Problem

As described in PTL 1, since a fiber reinforced resin including reinforcing fibers arranged with an orientation in a predetermined direction has strong load strength (high elastic modulus), it is useful for various structural materials, reinforcing materials and the like.

However, for example, vehicles are also required to reduce energy in the event of a collision, taking into account the safety of the people in the vehicle. In order to reduce the energy of a collision, automobiles are equipped with components made of materials such as rubber materials that tend to elongate when tensile loads are applied (i.e., have high breaking strain). However, the above fiber reinforced resins are considered to have low breaking strain and thus poor in impact absorption performance. On the other hand, rubber materials have low elastic modulus and are not suitable for use as structural or reinforcing materials.

In view of the above, an object of the present invention is to provide a molded body having high ability to reduce energy due to applied load, formed with a fiber reinforced resin including reinforcing fibers oriented and arranged in one direction, and a manufacturing method for the molded body.

Solution to Problem

A molded body according to an aspect of the present invention for solving the above-described problems includes a reinforced layer including stacked fiber reinforced resin layers, each of the fiber reinforced resin layers including a plurality of reinforcing fibers oriented and arranged in one direction, and a matrix resin impregnated in the plurality of reinforcing fibers. The reinforced layer includes a plurality of orientation shifted layers, the orientation shifted layers being at least a part of the fiber reinforced resin layers arranged with a shifted angle of 25 degrees to 65 degrees or −65 degrees to −25 degrees, the shifted angle being an angle of the plurality of reinforcing fibers with respect to a longitudinal axial direction of the reinforced layer.

A molded body according to another aspect of the present invention for solving the above-described problems includes a reinforced layer including a stacked fiber reinforced resin layers including a plurality of reinforcing fibers oriented and arranged in one direction and a matrix resin impregnated in the plurality of reinforcing fibers. The reinforced layer has a tensile elastic modulus of 5.0 GPa or greater and a breaking strain of 7.0%.

A manufacturing method for a molded body according to another aspect of the present invention for solving the above-described problems includes: forming a reinforced layer by stacking a plurality of fiber reinforced resins and welding the plurality of fiber reinforced resins with each other, each of the plurality of fiber reinforced resins having a thin-film shape and including a plurality of reinforcing fibers oriented and arranged in one direction and a matrix resin impregnated in the plurality of reinforcing fibers. The reinforced layer is formed by fusing the plurality of fiber reinforced resins having the thin-film shape disposed at an angle at which a plurality of fiber reinforced resin layers having a shifted angle of 25 degrees to 65 degrees or −65 degrees to −25 degrees is formed, the shifted angle being an angle of the plurality of reinforcing fibers with respect to a longitudinal axial direction of the reinforced layer.

Advantageous Effects of Invention

The present invention provides a molded body having high ability to reduce energy due to applied load, formed with a fiber reinforced resin including reinforcing fibers oriented and arranged in one direction, and a manufacturing method for the molded body.

DESCRIPTION OF EMBODIMENTS

1. Molded Body

An embodiment of the present invention relates to a molded body including a reinforced layer composed of stacked fiber reinforced resin layers each including a plurality of reinforcing fibers oriented and arranged in one direction and a resin composition (matrix resin) impregnated in the reinforcing fiber. The reinforced layer is composed of the stacked fiber reinforced resin layers, and the fiber reinforced resin layer includes layers that are stacked such that the orientational angle of the reinforcing fiber is shifted with respect to the longitudinal axial direction of the reinforced layer.

1-1. Reinforced Layer
1-1-1. Configuration of Reinforced Layer

The reinforced layer is composed of the plurality of stacked fiber reinforced resin layers. The plurality of fiber reinforced resin layers includes a plurality of fiber reinforced resin layers different from each other in orientational direction of the reinforcing fibers, and the matrix resin of each layer is fused and integrated.

Note that the fiber reinforced resin layer is a layer including a matrix resin and a set of a plurality of reinforcing fibers oriented in the same direction within the same layer. Therefore, a layer in which a plurality of reinforcing fibers is oriented in a certain direction and a layer in which a plurality of reinforcing fibers is oriented in a different direction are different fiber reinforced resin layers. In addition, when the cross section of the reinforced layer is observed in the case where a reinforced layer is manufactured by stacking a plurality of layers such that the reinforcing fibers are oriented in the same direction, the reinforcing fibers of the lower layer forming one set of reinforcing fibers and the reinforcing fibers of the upper layer forming a different set of reinforcing fibers are observed. Even in the case where layers in which the reinforcing fibers are oriented in the same direction are continuously disposed in the lamination direction as described above, layers that are formed as individual layers at the time of manufacture and as such sets of reinforcing fibers are separately observed in the cross section (i.e., a matrix resin rich region is observed between upper and lower sets of reinforcing fibers) are regarded as different fiber reinforced resin layers.

In addition, in the case where it is determined that the reinforced layer is formed by stacking and fusing UD sheets (described later) with the same thickness at the time of manufacture, the region with the thickness corresponding to the thickness of the single UD sheet may be set as one fiber reinforced resin layer.

The reinforced layer may make up a planar or three-dimensional molded body alone, or the reinforced layer may be disposed at the surface of another base material to reinforce the base material. In the case where the molded body includes a portion where the plurality of fiber reinforced resin layers is stacked and the matrix resin is fused, the entirety of the plurality of fiber reinforced resin layers is a reinforced layer.

The planar shape of the reinforced layer is a shape with a longitudinal axial direction, while the planar shape of the reinforced layer is not limited.

The longitudinal axial direction is, for example, the connecting direction of opposite short sides in the case where the base material layer has a rectangular shape, but the longitudinal axial direction may be the connecting direction of given opposite sides in the case where the molded body has a square shape. In the case where the molded body has a shape other than the above-described shapes, the longitudinal axial direction is the connecting direction of the opposite short sides of a rectangular shape with a largest area that can be included inside the molded body.

The reinforced layer includes a plurality of fiber reinforced resin layers (hereinafter referred to also simply as "orientation shifted layers") stacked and fused such that the angle (hereinafter referred to also simply as "shifted angle") of the orientational direction of the reinforcing fibers with respect to the longitudinal axial direction is 25 degrees to 65 degrees.

With the plurality of reinforcing fibers oriented and arranged in one direction, the molded body including the reinforced layer has an increased elastic modulus. Further, in the knowledge of the present inventor, the reinforced layer including the orientation shifted layer can absorb a lot of applied energy (e.g., the strain energy at break in a tensile test (hereinafter referred to also simply as "strain energy") is high). Therefore, the molded body including the reinforced layer has a high rigidity and is excellent in impact absorption performance.

On the other hand, a laminate in which the shifted angle is 0 degree and 90 degrees as that disclosed in PTL 1 has small strain energy although it has a high elastic modulus.

The plurality of orientation shifted layers may be continuously disposed in the lamination direction, or may be stacked with a layer other than the orientation shifted layer (i.e., a layer in which the reinforcing fiber is oriented in the longitudinal axial direction or a layer in which the shifted angle is not within 25 degrees to 65 degrees) sandwiched therebetween.

In addition, the shifted angle may be the same for all the plurality of orientation shifted layers, or the plurality of orientation shifted layers may include a plurality of orientation shifted layers with different shifted angles.

In addition, the plurality of orientation shifted layers may be disposed with the reinforcing fibers shifted in the same direction with respect to the longitudinal axial direction, or may include a layer in which the reinforcing fibers are shifted in a different direction with respect to the longitudinal axial direction. That is, in the case where the shifted angle in a given orientation shifted layer (e.g., an orientation shifted layer disposed at one end in the lamination direction) is set as a positive value (25 degrees to 65 degrees), the reinforced layer may include another orientation shifted layer in which the shifted angle is smaller than −25 degrees and greater than −65 degrees. Note that in the following description, the orientation shifted layer with the shifted angle of 25 degrees to 65 degrees is referred to also as "positive orientation shifted layer", and the orientation shifted layer with the shifted angle of −25 degrees to −65 degrees is referred to also as "negative orientation shifted layer".

Preferably, from the viewpoint of increasing the strain energy of the reinforced layer, the plurality of orientation shifted layers is continuously disposed in the lamination direction. In addition, preferably, from the same view point, the plurality of orientation shifted layers is disposed such that a positive orientation shifted layer and a negative orientation shifted layer are continuously disposed in the lamination direction.

In the case where the plurality of orientation shifted layers is continuously disposed in the lamination direction, the closer the shifted angles of the continuous two orientation shifted layers, the more preferable from the viewpoint of increasing the strain energy of the reinforced layer. More specifically, preferably, the difference between the absolute values of the shifted angles of the continuous two orientation shifted layers is 0 degree to 30 degrees, more preferably 0 degree to 20 degrees, more preferably 0 degree to 10 degrees, more preferably 0 degree to 5 degrees. Note that as used herein, the difference between the absolute values of the shifted angles means a value obtained by subtracting the shifted angle of the orientation shifted layer with the smaller absolute value of the shifted angle from the shifted angle of the orientation shifted layer with the larger absolute value of the shifted angle.

In addition, preferably in the case where a plurality of the pairs of the continuous two orientation shifted layers is included in the reinforced layer, the difference between the absolute values of the shifted angles of the continuous two orientation shifted layers in all pairs of the orientation shifted layers is 0 degree to 30 degrees, more preferably 0 degree to 20 degrees, more preferably 0 degree to 10 degrees, more preferably 0 degree to 5 degrees. In other words, preferably, the reinforced layer does not include a pair of continuous two orientation shifted layers where the difference between the absolute values of the shifted angles of the continuous two orientation shifted layers is not within the range.

Likewise, preferably, in the laminate, the difference between the absolute value of the shifted angle in the shifted layer and the absolute value of the angle, with respect to the longitudinal axial direction of the reinforced layer, of the reinforcing fiber oriented and arranged in one direction in the fiber reinforced resin layer disposed continuously to the orientation shifted layer in the lamination direction is 0 degree to 30 degrees, more preferably 0 degree to 20 degrees, more preferably 0 degree to 10 degrees, more preferably 0 degree to 5 degrees for all of the orientation shifted layer.

In addition, preferably, also in the case where a positive orientation shifted layer and a negative orientation shifted layer are continuously disposed in the lamination direction, the difference between the absolute values of the shifted angles of the continuous two orientation shifted layers is 0 degree to 30 degrees, more preferably 0 degree to 20 degrees, more preferably 0 degree to 10 degrees, more preferably 0 degree to 5 degrees from the viewpoint of increasing the strain energy of the reinforced layer.

Likewise, preferably, in the case where the reinforced layer includes a plurality of positive orientation shifted layers and a plurality of negative orientation shifted layers, the difference between the absolute value of the average value of the shifted angles of the positive orientation shifted layers and the absolute value of the average value of the shifted angles of the negative orientation shifted layers is 0 degree to 30 degrees, more preferably 0 degree to 20 degrees, more preferably 0 degree to 10 degrees, more preferably 0 degree to 5 degrees.

In addition, from the viewpoint of increasing the strain energy of the reinforced layer, preferably, the plurality of orientation shifted layers includes at least one pair of orientation shifted layers with closer shifted angles. More specifically, preferably, the plurality of orientation shifted layers includes one pair of orientation shifted layers with a shifted angle difference of 0 degree to 30 degrees, more preferably one pair of orientation shifted layers with a shifted angle difference of 0 degree to 20 degrees, more preferably one pair of orientation shifted layers with a shifted angle difference of 0 degree to 10 degrees, more preferably one pair of orientation shifted layers with a shifted angle difference of 0 degree to 30 degrees.

In addition, from the same view point, preferably, in the plurality of orientation shifted layers, the difference between the absolute value of the shifted angle in the orientation shifted layer with the largest absolute value of the shifted angle and the absolute value of the shifted angle in the orientation shifted layer with the smallest absolute value of the shifted angle is 0 degree to 30 degrees, more preferably 0 degree to 20 degrees, more preferably 0 degree to 10 degrees, more preferably 0 degree to 5 degrees.

Preferably, the reinforced layer includes three to 100 orientation shifted layers, more preferably four to 50 orientation shifted layers. In the case where three or more orientation shifted layers are provided, the warp of the reinforced layer less occurs. In the case where 100 or less orientation shifted layers are provided, the ease of the production of the reinforced layer increases.

Note that the reinforced layer or the molded body may include a layer different from the orientation shifted layer (hereinafter referred to also simply as "non-orientation shifted layer"). It should be noted that preferably, from the viewpoint of increasing the breaking strain and the strain energy of the reinforced layer, the reinforced layer or the molded body does not include a non-orientation shifted layer with a shifted angle equal to or greater than 0 degree and smaller than 25 degrees. In addition, preferably, from the viewpoint of increasing the elastic modulus and the strain energy of the reinforced layer, the reinforced layer or the molded body does not include a non-orientation shifted layer with an angle greater than 65 degrees and equal to or smaller than 90 degrees. From these view points, more preferably, the reinforced layer or the molded body includes no non-orientation shifted layer.

In addition, the reinforced layer need only include an orientation shifted layer with a shifted angle of 25 degrees to 65 degrees; however, preferably, the reinforced layer includes an orientation shifted layer with a shifted angle of 25 degrees to 50 degrees, more preferably an orientation shifted layer with a shifted angle of 30 degrees to 45 degrees from the viewpoint of increasing the elastic modulus, the breaking strain and the strain energy of the reinforced layer.

Preferably, the thickness of the reinforced layer is 0.3 mm to 10 mm, more preferably 0.4 mm to 5 mm. In the case where the thickness is 0.3 mm or greater, a larger strain energy can be achieved, and the handleability of the molded body composed only of the reinforced layer is improved. In the case where the thickness is 10 mm or smaller, the followability to the surface shape (such as a curved surface and a step) of the base material where the reinforced layer is disposed is increased.

Preferably, the area of the surface parallel to a plane where the reinforcing fiber is oriented in the reinforced layer is 0.01 $m^2$ or greater, more preferably 0.05 $m^2$ or greater, more preferably 0.1 $m^2$ or greater. In the case where the area of the surface with the largest area has the above-described value or greater, the area is sufficient even when it is fixed with a fastening tool and the like, and thus it is likely to achieve an effect of improving the strain energy. For example, the area of the surface with the largest area may be 100 $m^2$ or smaller. Note that preferably, in the case where the molded body is composed only of the reinforced layer and the areas differ between the front and rear surfaces, the area of the front or rear surface with the smaller area is within the above-described range.

Preferably, the minimum width (the width in the direction orthogonal to the longitudinal axial direction in the plane where the reinforcing fiber is oriented) of the reinforced layer is 5 mm or greater, more preferably 10 mm or greater, more preferably 20 mm or greater. In the case where the minimum width is the above-described value or greater, the effect of improving the strain energy is more likely to be achieved even when there are slight defects such as chipping generated in actual manufacturing. The minimum width of the reinforced layer may be 10 m or smaller, for example.

The reinforced layer is composed of stacked fiber reinforced resin layers containing a plurality of reinforcing fibers oriented and arranged in one direction and matrix resin impregnated in the reinforcing fiber. The fiber reinforced resin layer further includes the orientation shifted layer. Typically, the matrix resins are welded and integrated with each other between layers.

The reinforced layer having the above-described configuration has a high tensile elastic modulus and a large breaking strain. Therefore, the reinforced layer is less deformable, but has a large elongation until breakage when deformed under application of high stress. Therefore, the strain energy of the reinforced layer is large. More specifically, the reinforced layer can have a tensile elastic modulus of 5.0 GPa or greater and a breaking strain of 7.0%. Preferably, the tensile elastic modulus of the reinforced layer is 5.0 GPa or greater, more preferably 10.0 GPa or greater. The upper limit of the tensile elastic modulus of the reinforced layer may be 100.0 GPa or smaller, while the upper limit is not limited. Preferably, the breaking strain of reinforced layer is 5.0% or greater, more preferably 8.0% or greater. The upper limit of the breaking strain of the reinforced layer may be 300.0% or smaller, while the upper limit is not limited.

Likewise, preferably, the tensile breaking strength of the reinforced layer is 20.0 MPa or greater, more preferably 100.0 MPa or greater. The upper limit of the tensile breaking strength of the reinforced layer may be 2000.0 MPa or smaller, while the upper limit is not limited. In addition, preferably, the strain energy per unit volume of the reinforced layer is 1 N·mm/mm$^3$ or greater, more preferably 2.00 N·mm/mm$^3$ or greater. The upper limit of the strain energy per unit volume of the reinforced layer may be 10.00 N·mm/mm$^3$ or smaller, while the upper limit is not limited.

The tensile elastic modulus and the breaking strain of the reinforced layer may be set to a value obtained in compliance with ISO 527-5 (2009) on the basis of the stress strain curve obtained from results of a tensile test performed on a reinforced layer cut into a tensile test sample shape with 250 mm (length)×15 mm (width) at a tensile speed of 1.5 mm per minute and at a temperature of 23° C. with a tensile testing instrument (e.g., AG-X 100 kN available from Shimadzu Corporation).

1-1-2. Reinforcing Fiber

The material of the reinforcing fiber is not limited. For example, carbon fiber, glass fiber, aramid fiber, alumina fiber, silicon carbide fiber, boron fiber, and metal fiber and the like may be used as the reinforcing fiber. Among them, carbon fiber and glass fiber are preferable.

Preferably, the average diameter of the reinforcing fiber is 1 μm to 20 μm, more preferably 4 μm to 10 μm from the viewpoint of sufficiently increasing the effect of improving the strength with the reinforcing fiber.

The length of the reinforcing fiber is normally 15 mm or greater. Preferably, the lower limit value of the length of the reinforcing fiber is 20 mm or greater, more preferably 100 mm or greater, more preferably 500 mm or greater. The maximum value of the upper limit of the length of the reinforcing fiber is 50 m, for example. Normally, a UD sheet cut into a desired length after the manufacture is used as a UD sheet used for the manufacturing method for the molded body described later. As such, the length of the reinforcing fiber included in the UD sheet included in the molded body may possibly be smaller than the minimum value of the above-described length in some situation.

In addition, the reinforcing fibers may be sized with a sizing agent.

Preferably, the sizing agent is modified polyolefin, more preferably modified polyolefin containing carboxylic acid metal salt, while the sizing agent is not limited. The modified polyolefin is, for example, one in which a carboxylic acid group, carboxylic anhydride group, or carboxylic acid ester group is grafted into the polymeric chain of an unmodified polyolefin and a salt is formed between the above functional group and a metal cation.

The unmodified polyolefin is preferably an ethylene-based polymer with a content of more than 50 mol % of the component units derived from ethylene, or a propylene-based polymer with a content of more than 50 mol % of the component units derived from propylene. Examples of the ethylene-based polymer include ethylene monopolymer and copolymer of ethylene and α-olefin with 3 to 10 carbon atoms. Examples of the propylene-based polymer include propylene monopolymer, and copolymer of propylene and ethylene or α-olefin with 4 to 10 carbon atoms. Preferably, the unmodified polyolefin is homopolypropylene, homopolyethylene, ethylene-propylene copolymer, propylene-1-butene copolymer, or ethylene-propylene-1-butene copolymer.

In addition, the reinforcing fibers may be converged into a fiber batch. Preferably, the number of single fibers per converged carbon fiber batch in this case is 100 to 100,000, more preferably 1,000 to 50,000.

Preferably, the content of the reinforcing fiber with respect to the total mass of the reinforced layer is 20 wt % to 80 wt %, more preferably 30 wt % to 75 wt %, more preferably 30 wt % to 65 wt %, more preferably 35 wt % to 60 wt %.

Preferably, the content of the reinforcing fiber with respect to the total volume of reinforced layer is 10 vol. % to 70 vol. %, more preferably 15 vol. % to 60 vol. %, more preferably 20 vol. % to 60 vol. %.

1-1-3. Matrix Resin

The material of the matrix resin is not limited, and the matrix resin may be thermoplastic resin or thermosetting resin. In addition, the matrix resin may be crystalline resin or non-crystalline resin.

Examples of the thermoplastic resin include polyolefin resins including polyethylene, polypropylene, polybutene, and poly4-methyl-1-pentene, polyamide resin, polyester resin, polystyrene resin, thermoplastic polyimide resin, polyamideimide resin, polycarbonate resin, polyphenylene ether resin, polyphenylene sulfide resin, polyacetal resin, acrylic resin, polyetherimide resin, polysulfone resin, polyetherketone resin, polyether ether ketone resin, polyarylate resin, polyether nitrile resin, polyvinyl chloride resin, ABS resin, and fluoropolymer resin.

Examples of the thermosetting resin include epoxy resin, phenol resin, melamine resin, urea resin, diallyl phthalate resin, silicone resin, urethane resin, furan resin, ketone resin, xylene resin, heat curable polyimide resin, unsaturated polyester resin and diallyl terephthalate resin.

Among them, thermoplastic resin is preferable from the viewpoint of increasing the strain energy of the reinforced layer. In addition, among thermoplastic resins, polyamide resin and polyolefin resin are preferable from the same view point.

The matrix resin may be a resin composition containing additives. Examples of the additives include publicly known fillers (inorganic fillers and organic fillers), pigment, dye, weather-resistant stabilizer, heat-resistant stabilizer, charging inhibitor, slip inhibitor, antioxidant, molded body inhibitor, antibacterial agent, fire retardant, and softener. For example, in the case where a reinforced layer is formed by fusing a UD sheet through laser irradiation, the matrix resin is preferably a resin composition containing a coloring matter that absorbs the laser of the irradiation wavelength. The coloring matter need only be a coloring matter that absorbs light of any wavelength between 300 nm to 3000 nm, while carbon black is preferable.

In addition, the matrix resin may contain resins other than the above-described resin, and other components such as short fibers with a length smaller than that of the above-described reinforcing fiber.

Preferably, the content of the matrix resin with respect to the total mass of the reinforced layer is 20 wt % to 80 wt %, more preferably 25 wt % to 70 wt %, more preferably 35 wt % to 70 wt %, more preferably 40 wt % to 65 wt %.

1-2. Shape and Configuration of Molded Body

The reinforced layer may make up a molded body with the reinforced layer alone, or may be disposed at the surface of another base material so as to make up a molded body including the base material and the reinforced layer. In either case, from the viewpoint of uniformizing the fiber directions of the layers, the reinforced layer is preferably a planar shaped molded body, or a layer formed in a two-dimensional shape at the surface of another base material.

In the case where a molded body is composed only of a reinforced layer, the shape of the molded body may be a planar shape or a curved shape. In addition, in this case, the shape of the molded body may be a three-dimensional shape.

The base material may be composed of any of resin, metal and ceramics. In addition, the shape of the base material may be a planar shape, a curved shape, or a three-dimensional shape with a hat-shaped cross-section, an I-shaped cross-section or a U-shaped cross-section.

The reinforced layer may be bonded to the surface of the base material with an adhesive agent, and, in the case where the base material contains resin, the resin making up the base material and the matrix resin included in the reinforced layer may be fused and joined. In this case, the resin making up the base material is preferably the same type as the matrix resin of the reinforced layer. Note that the resin of the same type means that the bonding structure (such as ester structure and amide bonds) that bonds each constituent unit derived from the monomer in the main chain that constitutes the resin is the same, or that they are bonded by the same polymerizable group (such as vinyl group). The resin of the same type has a constituent unit derived from the same monomer (such as ethylene and propylene).

The shape of the base material is not limited. For example, the base material may have an elongated shape extended in one direction. Preferably, in this case, the longitudinal axial direction of the base material and the longitudinal axial direction of the reinforced layer substantially coincide with each other. The reinforced layer has a high strength in the longitudinal axial direction of the reinforced layer of the base material where the reinforced layer is disposed, and can efficiently reduce the energy of an applied load. Therefore, by making the longitudinal axial direction of the base material substantially coincide with the longitudinal axial direction of the reinforced layer, it can be favorably used as structural or reinforcing materials for applications where loads are expected to be applied in the longitudinal axial directions.

Note that "substantially coincide" as used herein means to include not only a state where the angle difference of their directions is 0 degree, but also a state where there is a slight angle difference. More specifically, "substantially coincide" as used herein means that the angle difference of their directions is 0 degree to 10 degrees, and preferably it is 0 degree to 5 degrees.

2. Manufacturing Method for Molded Body

The manufacturing method for molded body is not limited. For example, the molded body may be manufactured by a method of bonding a preliminarily produced reinforced layer to the surface of the base material, a method of fusing a thin-film shaped fiber reinforced resin (also referred to simply as "UD sheet") including a plurality of reinforcing fibers oriented and arranged in one direction and a matrix resin impregnated in the reinforcing fibers onto the surface of the base material through hot pressing and/or laser irradiation, and a method of integrating a reinforced layer with the base material through insert molding. In this case, a molded body composed only of the reinforced layer can be obtained by fusing only the UD sheet through hot pressing and/or laser irradiation without using the base material.

In the case where the reinforced layer is produced by using the UD sheet, it suffices to stack the UD sheets such that the angles of the UD sheets are shifted and that the shifted angles of respective orientation shifted layers are within the above-described range or stack the UD sheets with different orientational directions of the reinforcing fibers, and fuse the UD sheets through hot pressing and/or laser irradiation.

Alternatively, it is possible to repeat a step of forming another fiber reinforced resin layer (orientation shifted layer) through hot pressing and/or laser irradiation by disposing a UD sheet for forming a next fiber reinforced resin layer such that the shifted angle is within the above-described range with respect to a UD sheet already disposed to the base material or a UD sheet fused to a lower fiber reinforced resin layer.

Preferably, the content of the reinforcing fiber with respect to the total mass of the UD sheet is 20 wt % to 80 wt %, more preferably 30 wt % to 75 wt %, more preferably 30 wt % to 65 wt %, more preferably 35 wt % to 60 wt % or smaller. In addition, preferably, the content of the matrix resin with respect to the total mass of the UD sheet is 20 wt % to 80 wt %, more preferably 25 wt % to 70 wt %, more preferably 35 wt % to 70 wt %, more preferably 40 wt % to 65 wt %.

Preferably, the content of the reinforcing fiber with respect to the total volume of the UD sheet (fiber volume content: Vf) is 10 vol. % to 70 vol. %, more preferably 15 vol. % to 60 vol. %, more preferably 20 vol. % to 60 vol. %.

While the thickness of the UD sheet is not limited, the thickness of the UD sheet is preferably 1 μm to 500 μm, more preferably 5 μm to 400 μm, more preferably 5 μm to 300 μm.

The use of the UD sheet is not limited, and a single UD sheet may be used as it is, or the UD sheet may be used by appropriately cutting it into a tape form.

Note that the reinforced layer may be produced by assembling the reinforcing fiber such that the shifted angle of the orientation shifted layer is within the above-described range, and then impregnating the matrix resin in the reinforcing fiber.

3. Use

The use of the molded body is not limited, but it is useful as a material for reinforcing other structural materials, and especially as a material for reinforcing members of vehicles and aircrafts where momentary impact occurs.

Specific examples of the use of the molded body include: primary structural materials including wings and vertical and horizontal tail fins; secondary structural materials including auxiliary wings, directional and elevator rudders; interior materials including seats and tables; component parts, such as power devices, hydraulic cylinders, and composite brakes, of general flying vehicles such as aircrafts and helicopters; rocket component parts including nozzle cones and motor cases; satellite component parts and materials including antennas, structures, solar panels, battery cases and telescopes; machine part components including frames, shafts, rollers, plate springs, machine tool heads, robot arms, transfer hands and synthetic fiber pots; high-speed rotor component parts including centrifuge rotors and uranium enrichment cylinders; electronic and electrical components and parts including parabolic antennas, battery components, radar, acoustic speaker cones, computer components, printer components, PC chassis and tablet chassis; automobile and motorcycle parts components including skeleton parts, semistructural parts, exterior parts, interior and exterior parts, power units, other equipment—hydraulic cylinders, brakes, battery cases, drive shafts, engine parts, spoilers, racing car bodies, crash cones, chairs, tabletops, phone covers, under covers, side covers, transmission covers, battery trays, rear steps, spare tire containers, bus body walls and truck body walls; vehicle component parts and materials including interior materials, floor panels, ceiling panels, linear motor car bodies, Shinkansen/railway car bodies, window wipers, bogies and seats; ship parts and fuselages including ship hulls including yachts, cruisers and boats, masts, rudders, propellers, rigid sails, screws, military ship fuselages, submarine fuselages and deep sea exploration vessels; pressure vessel component parts including actuators, cylinders, canisters, hydrogen tanks, CNG tanks and oxygen tanks; scientific equipment parts and components including agitator blades, pipes, tanks, pit floors and plant piping; wind power component parts and components including blades, skins, skeletal structures and de-icing systems; components and supplies for medical and nursing care equipment including parts for X-ray diagnostic equipment, wheelchairs, artificial bones, artificial legs and hands, crutches, nursing care assistive devices and robots (power-assisted suits), walkers, and nursing care beds; civil construction and infrastructure component materials including CF composite cables, concrete reinforcement members, guardrails, bridges, tunnel walls, hoods, cables, tension rods, strand rods and flexible pipes; component parts and components for subsea oilfield mining including marine risers, flexible jumpers, flexible risers and drilling risers; sports and leisure equipment including fishing rods, reels, golf clubs, tennis rackets, badminton rackets, ski boards, poles, snowboards, ice hockey sticks, snowmobiles, archery equipment, kendo shinai, baseball bats, swimming boards, sports equipment for the disabled and sports helmets; bicycle parts including frame, disc wheels, rims, handlebars and saddles; household goods including glasses, bags, umbrellas and ballpoint pens; and parts components and supplies for other industrial applications including plastic pallets, containers, material handling materials, plastic molds, furniture, umbrellas, helmets, pipes, scaffold boards, safety shoes, protectors, fuel cell covers, drone blades, frames, jigs and jig frames.

Examples

The present invention is described in more detail below with Examples, but the scope of the present invention is not limited to the Examples.
1. Production of Molded Body
As the UD sheet, a UD sheet including polypropylene impregnated in carbon fibers arranged in one direction (TAFNEX (registered trademark) available from MITSUI CHEMICALS, INC, with a fiber volume fraction (VF) of 50% and a thickness of 0.16 mm) was prepared. A fusing sheet was produced by cutting this UD sheet into a size of (length) 300 mm×(width) 200 mm such that the orientational direction of the carbon fiber is at 30 degrees with respect to the vertical direction.

Seven fusing sheets were disposed in an overlapping manner at the surface of a polyimide releasing film (bottom surface film), and another polyimide releasing film (top surface film) was further disposed on top of that. The seven fusing sheets were disposed such that the orientational directions of the carbon fibers are alternately 30 degrees and −30 degrees with respect to one direction set along the surface of the bottom surface film.

A laminate of the bottom surface film, the seven fusing sheets and the top surface film were disposed in a pressing apparatus (a mini-test press machine available from Toyo Seiki Seisaku-sho, Ltd.) and held at a pressing temperature of 180° C. under a pressure of 2 MPA for 3 minutes, and thereafter, the pressure was released. Immediately thereafter, the heat-pressed laminate was placed in a cooling press machine with 30° C. cooling water passed therethrough and held for 3 minutes under a 2 MPa pressure applied thereto, and then the pressure was released. The laminate was then removed from the cooling press machine and the release film was removed to obtain molded body 1 composed only of a reinforced layer of seven laminated fiber reinforced resin layers.

Molded body 2 to molded body 8 were obtained by producing and hot pressing the fusing sheet such that the angle of the orientational direction of the carbon fiber with respect to one direction set along the surface of the bottom surface film has the angle shown in Table 1 in the seven fusing sheets disposed at the releasing film. Note that in production of molded body 4, a UD sheet (with a fiber volume fraction (VF) of 50% and a thickness of 0.16 mm) including polyamide 12 (UBESTA3014U available from Ube Industries, Ltd.) impregnated in the carbon fibers arranged in one direction was prepared.

Table 1 shows the type of the matrix resin and the angle of the orientational direction of the carbon fiber with respect to the one direction in the fiber reinforced resin layers of the layers of molded body 1 to molded body 8. Note that the first layer is the layer disposed on the most top surface film side, and the seventh layer is the layer disposed on the most bottom surface film side.

TABLE 1

| Notes Molded Body No. Matrix Resin | | Example 1 PP | Example 2 PP | Example 3 PP | Example 4 PA12 | Comparative Example 5 PP | Comparative Example 6 PP | Comparative Example 7 PP | Comparative Example 8 PP |
|---|---|---|---|---|---|---|---|---|---|
| Orientational Direction of Carbon Fiber | First Layer | 30° | 45° | 60° | 45° | 10° | 75° | 0° | 0° |
| | Second Layer | −30° | −45° | −60° | −45° | −10° | −75° | 90° | 0° |
| | Third Layer | 30° | 45° | 60° | 45° | 10° | 75° | 0° | 0° |
| | Fourth Layer | −30° | −45° | −60° | −45° | −10° | −75° | 90° | 0° |
| | Fifth Layer | 30° | 45° | 60° | 45° | 10° | 75° | 0° | 0° |

TABLE 1-continued

| Notes<br>Molded Body No.<br>Matrix Resin | | Example<br>1<br>PP | Example<br>2<br>PP | Example<br>3<br>PP | Example<br>4<br>PA12 | Comparative<br>Example<br>5<br>PP | Comparative<br>Example<br>6<br>PP | Comparative<br>Example<br>7<br>PP | Comparative<br>Example<br>8<br>PP |
|---|---|---|---|---|---|---|---|---|---|
| | Sixth Layer | −30° | −45° | −60° | −45° | −10° | −75° | 90° | 0° |
| | Seventh Layer | 30° | 45° | 60° | 45° | 10° | 75° | 0° | 0° |

2. Evaluation on Molded Bodies

Molded body 1 to molded body 8 were cut into tensile test samples with a size of 250 mm (length)×15 mm (width) with the vertical direction set as the one direction set along the surface of the bottom surface film. Tensile test pieces were obtained by bonding a tab (NIKOLYTE NL-EG available from NIKKO KASEI CO., LTD, 56 mm×15 mm×1.5 mm) made of glass fiber reinforced resin (GFRP) to the both end portions in the vertical direction of the cut piece cut out from each molded body with an adhesive agent (aronalpha extra 4020 available Toagosei, Inc).

Each test piece was installed in a tensile testing instrument (AG-X 100 kN available from Shimadzu Corporation) and a tensile test was conducted at a tensile speed of 1.5 mm per minute and a temperature of 23° C. The tensile elastic modulus, the tensile breaking strength and the breaking strain were determined from the obtained stress strain diagram in compliance with ISO 527-5 (2009). In addition, the integral value of the stress until breakage in the stress strain diagram was set as strain energy, and the obtained strain energy was divided by the volume of the tensile test piece to determine the strain energy per unit volume.

Table 2 shows resulting evaluations of molded body 1 to molded body 8.

Conversely, in the case where the angle of the orientational direction of the carbon fiber was set to 25 degrees to 65 degrees, a molded body with high elastic modulus, high breaking strain, and high strain energy was obtained (molded body 1 to molded body 4).

This application is entitled to and claims the benefit of Japanese Patent Application No. 2020-156417 filed on Sep. 17, 2020, the disclosure each of which including the specification, drawings and abstract is incorporated herein by reference in its entirety.

INDUSTRIAL APPLICABILITY

The molded body of the embodiments of the present invention has high elasticity and high ability to reduce the energy of the applied load. Therefore, the molded body of the embodiments of the present invention can be favorably used for various structural materials and reinforcing materials.

The invention claimed is:

1. A molded body comprising a reinforced layer including stacked fiber reinforced resin layers, each of the fiber reinforced resin layers including a set of a plurality of

TABLE 2

| Notes<br>Molded Body No. | | Example<br>1 | Example<br>2 | Example<br>3 | Example<br>4 | Comparative<br>Example<br>5 | Comparative<br>Example<br>6 | Comparative<br>Example<br>7 | Comparative<br>Example<br>8 |
|---|---|---|---|---|---|---|---|---|---|
| Tensile Elastic Modulus | (GPa) | 17.9 | 5.7 | 5.3 | 5.8 | 97 | 4.9 | 43.5 | 107 |
| Tensile Breaking Strength | (MPa) | 340 | 125 | 27 | 141 | 1160 | 20 | 655 | 1430 |
| Breaking Strain | (%) | 8.7 | 31.1 | 70.8 | 39.5 | 1.5 | 6.1 | 1.6 | 1.3 |
| Strain Energy per Unit Volume | (N · mm/mm$^3$) | 2.46 | 2.87 | 1.54 | 2.66 | 0.63 | 0.04 | 0.12 | 0.45 |

As is clear from Table 2, the closer the angle of the orientational direction of the carbon fiber with respect to the longitudinal (length) direction of the molded body to 0 degree, the higher the tensile elastic modulus and the tensile breaking strength, while the lower the breaking strain (molded body 5, molded body 8 and the like). In addition, the same shape resulted also in the case where the orientational direction of the carbon fiber was set to 0 degree and 90 degrees (molded body 7). In the case where the orientational direction of the carbon fiber was set closer to 90 degrees, the breaking strain was increased, while the tensile elastic modulus was reduced, and, the strain energy was extremely reduced (molded body 6).

reinforcing fibers oriented and arranged in one direction and a matrix resin impregnated in the plurality of the reinforcing fibers, wherein the reinforced layer is composed only of a plurality of thin-film shaped fiber reinforced resin including a plurality of reinforcing fibers oriented and arranged in one direction and a matrix resin impregnated in the reinforcing fibers, that are fused with each other, thereby each of the thin-film shaped fiber reinforced resin forming each layer of the stacked fiber reinforced resin layers, the reinforced layer includes a matrix resin rich region between adjacent sets of a plurality of the reinforcing fibers that are continuously placed in a lamination direction, each set of the adjacent plurality of the reinforcing fibers being contained in two adjacent fiber-reinforced resin layers that are continuously disposed in a lamination direction, the reinforced layer includes a plurality of orientation shifted layers, the orientation shifted layers being at least a part of the fiber reinforced resin layers arranged with a shifted angle of 25 degrees to 65 degrees or −65 degrees to −25 degrees, the shifted angle being an angle of the plurality of the reinforcing fibers with respect to a longitudinal axial direction of the reinforced layer, the plurality of the orientation shifted layers includes a positive orientation shifted layer where the shifted angle is 25 degrees to 65 degrees; and a negative orientation shifted layer where the shifted angle is −65 degrees to −25 degrees, the plurality of the orientation shifted layers includes a pair of the orientation shifted layers continuously disposed in a lamination direction, and the molded body does not include a non-orientation shifted layer adjacent to an orientation shifted layer among the plurality of the orientation shifted layers, the non-orientation shifted layer being a layer including a plurality of the reinforcing fibers arranged in an orientation of an angle greater than −25 degrees and smaller than 25 degrees, with respect to the longitudinal axial direction of the reinforced layer, and the matrix resin impregnated in the plurality of the reinforcing fibers and fused with the matrix resin of the orientation shifted layer.

2. The molded body according to claim 1, wherein a difference between absolute values of the shifted angles is 10 degrees or smaller in all pairs of the orientation shifted layers.

3. The molded body according to claim 2, wherein the pair of orientation shifted layers continuously disposed is composed of:
a positive orientation shifted layer where the shifted angle is 25 degrees to 65 degrees; and
a negative orientation shifted layer where the shifted angle is −65 degrees to −25 degrees.

4. The molded body according to claim 1, wherein between an orientation shifted layer with a largest absolute value of the shifted angle and an orientation shifted layer with a smallest absolute value of the shifted angle in the reinforced layer, a difference between absolute values of the shifted angles is 10 degrees or smaller.

5. The molded body according to claim 1, wherein a difference between an absolute value of the shifted angle in the orientation shifted layer, and an absolute value of an angle of a plurality of reinforcing fibers with respect to the longitudinal axial direction of the reinforced layer in a fiber reinforced resin layer including the plurality of reinforcing fibers and a matrix resin impregnated in the plurality of reinforcing fibers and fused with a matrix resin of the orientation shifted layer, is 10 degrees or smaller for all of the orientation shifted layer.

6. The molded body according to claim 1, wherein the molded body does not include a non-orientation shifted layer, the non-orientation shifted layer being a layer including a plurality of the reinforcing fibers arranged in an orientation of an angle greater than 65 degrees and equal to or smaller than 90 degrees or an angle equal to or greater than −90 degrees and smaller than −65 degrees with respect to the longitudinal axial direction of the reinforced layer, and the matrix resin impregnated in the plurality of reinforcing fibers and fused with a matrix resin of the orientation shifted layer.

7. The molded body according to claim 1, wherein the matrix resin is a thermoplastic resin.

8. The molded body according to claim 7, wherein the matrix resin contains coloring matter that absorbs light of any wavelength between 300 nm to 3000 nm.

9. The molded body according to claim 1, wherein the plurality of reinforcing fibers is a carbon fiber or a glass fiber.

10. The molded body according to claim 1, wherein the reinforced layer has a tensile elastic modulus of 5.0 GPa or greater and a breaking strain of 7.0%.

11. The molded body according to claim 1, comprising the reinforced layer and a base material, wherein the base material including the reinforced layer at a surface, provided that in the case where the molded body includes a portion where the plurality of fiber reinforced resin layers is stacked and the matrix resin is fused, the entirety of the plurality of fiber reinforced resin layers is a reinforced layer.

12. The molded body according to claim 11,
wherein the base material has an elongated shape; and
wherein an angle difference between a longitudinal axial direction of the base material and a longitudinal axial direction of the reinforced layer is 0 degree to 10 degrees.

13. The molded body according to claim 1, wherein the molded body is composed only of the reinforced layer.

14. The molded body according to claim 1,
wherein the reinforced layer does not contain a layer which is produced by assembling the reinforcing fiber, and impregnating the matrix resin in the reinforcing fiber that is assembled.

15. The molded body according to claim 1,
wherein the molded body includes fused portions between adjacent layers.

16. A method of manufacturing the molded body according to claim 1, comprising:
forming a reinforced layer by stacking a plurality of fiber reinforced resins and welding the plurality of fiber reinforced resins with each other, each of the plurality of fiber reinforced resins having a thin-film shape and including a plurality of reinforcing fibers oriented and arranged in one direction and a matrix resin impregnated in the plurality of reinforcing fibers,
wherein the reinforced layer is formed by fusing the plurality of fiber reinforced resins having the thin-film shape,
wherein a positive orientation shifted layer where a positive orientation shifted layer where a shifted angle of 25 degrees to 65 degrees and a negative orientation shifted layer where −65 degrees to −25 degrees, the shifted angle being an angle of the plurality of reinforcing fibers with respect to a longitudinal axial direction of the reinforced layer, are stacked,
wherein at least two layers selected from the group of the positive orientation shifted layer and the negative orientation shifted layer are stacked continuously, and
wherein a non-orientation shifted layer being a layer including a plurality of reinforcing fibers arranged in an orientation of an angle greater than −25 degrees and smaller than 25 degrees, with respect to the longitudinal axial direction of the reinforced layer, and a matrix resin impregnated in the plurality of reinforcing fibers and fused with a matrix resin of an orientation shifted layer that is adjacent to the non-orientation shifted layer, is not stacked.

* * * * *